July 25, 1961 G. W. DAFLER 2,993,690
LEAF SPRING
Filed Jan. 8, 1959
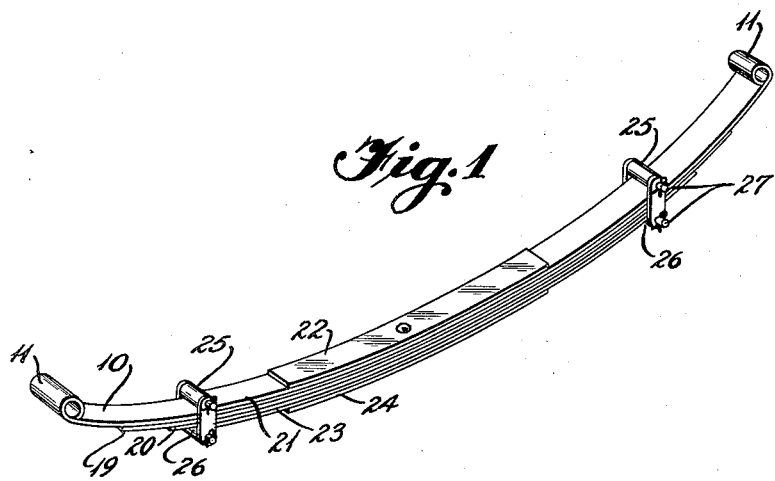
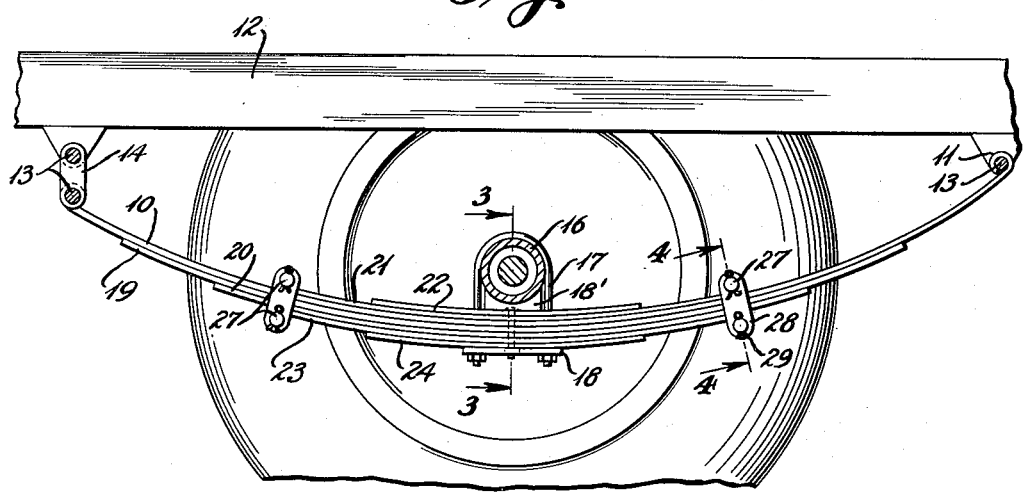
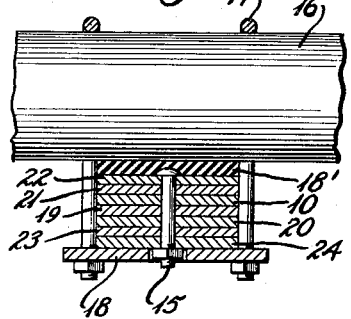
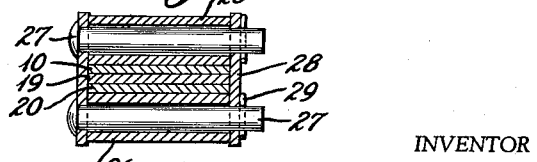
INVENTOR
George W. Dafler
BY
ATTORNEY

United States Patent Office 2,993,690
Patented July 25, 1961

2,993,690
LEAF SPRING
George W. Dafler, 1112 Vine St., New Castle, Ind.
Filed Jan. 8, 1959, Ser. No. 785,746
1 Claim. (Cl. 267—47)

This invention relates to the support of matter and to the absorbing or cushioning of shock between the matter supported and that to which the support may be subjected, and to the prevention as much as possible of the transmission of such shock so that there will be minimum disturbance to the matter supported.

The invention relates particularly to leaf spring structure of the character used in vehicles including automobiles and the like, and which leaf spring structure is employed for supporting the load carrying part of the vehicle upon or from the running gear thereof so that when rough terrain is encountered the load will be subjected to minimum disturbance.

Leaf springs have provided cushioning action to a degree found inadequate, having contributed to side sway when traveling in a straight line and to instability on turns as well as causing undesirable rebounds from shock. The supporting action of leaf springs has been improved by the use of shock absorbers, however, a substantial amount of instability, sway, and lack of control of the cushioning action is still encountered.

It is an object of the invention to overcome the difficulties enumerated and to provide a leaf spring having improved cushioning characteristics without appreciable start and stop dipping, side sway, large shock reducing and small shock eliminating characteristics as well as a leaf spring which will help to maintain a constant level of the substance supported as well as a better rounding of the curves or corners regardless of speed.

Another object of the invention is to provide a leaf spring of improved characteristics by minimum change in the structure of a spring already in use, and which change is relatively inexpensive and the results far exceed the cost or of anything believed possible.

Other objects and advantages of the invention will become apparent from the accompanying drawing taken in conjunction with the following description wherein:

FIG. 1 is a perspective illustrating one application of the invention;

FIG. 2, a side elevation of the invention applied; and

FIGS. 3 and 4, sections respectively on the lines 3—3 and 4—4 of FIG. 2.

Briefly stated, the present invention utilizes a leaf spring of a length and strength to provide the proper cushioning support for matter to be suspended such as the body of an automobile or the like. When the parts are in operative position, the ends of the leaf spring will be flexed from the uppermost unweighted position down toward a straight-line position in accordance with the weight supported. To this conventional spring structure, the present invention is applied. This includes reinforcing leaves both above and below the conventional spring leaves and with the contiguous upper and lower leaves provided with bolt receiving ends and with bolts in each of the same, with the adjacent bolts at one end connected by links. Thus, the conventional spring is supported and restricted in its supporting action against downward and upward movement of the weight supported as well as against twisting of the spring and the separation of the leaves thereof with resultant instability.

With continued reference to the drawing, the leaf spring of the present invention is composed of a series of leaves, the longer leaf 10 having a sleeve or eye at each end for the attachment of the spring to that which it is to support such as the frame 12 of an automobile or other vehicle or object by means of bolts 13, and links 14 at one end and a bolt 13 to a fixed part of the frame at the other end.

The leaf 10 is reinforced on its top and bottom by means of additional leaves held together by bolt and nut 15 and the spring is fixed to an axle housing 16 by means of a pair of U-bolts and nuts 17 and a plate 18. Between the spring and the axle housing is interposed a resilient bumper 18'. All of the parts which have been described are of conventional construction and supporting leaves 19 and 20 also are of conventional construction.

Above and below the conventional leaves 10, 19 and 20 are long and short reinforcing members 21 and 22 on the upper side, while on the lower side similar reinforcing members 23 and 24 are added. The members 21 and 23 have terminal sleeves or eyes 25 and 26, respectively, with the adjacent eyes 25 and 26 connected by bolts and links 27 and 28 with cotter pins 29 locking the parts in their assembled relation.

The leaves 22 and 24 merely serve to reinforce the leaves 21 and 23, and the latter with their extremities connected in the manner indicated limit the leaves 10, 19 and 20 so that the action of the spring is controlled and an improvement over anything heretofore produced is the result.

The leaves 21 and 23 allow limited upward and downward flexing of the intermediate leaves 10, 19 and 20 and the links 28 maintain the leaves in balance and restrain them in certain respects vertically and also limit them against edgewise movement, as well as prevent their separation.

Before the application of the auxiliary leaves 21, 22, 23 and 24, the normal weight to be supported by the leaves 10, 19 and 20 is determined, and thereafter the auxiliary leaves 21, 22, 23, and 24, are added, the length, width and strength of the auxiliary leaves being correlated with those of the principal leaves, thus insuring the proper relation between the principal and auxiliary leaves in accordance with the service to be performed.

With the auxiliary leaves applied to the principal leaves, the sum of such leaves are readily available to support weight to reinforce, supplement, and restrict the action of the principal leaves including to limit rebound from shock, reduce reaction on stopping and starting, as well as swing and sway on a straightaway, around curves, and when a shock is encountered.

It will be obvious to those skilled in the art that various changes may be made in the invention without departing from the spirit and scope thereof, and therefore the invention is not limited by that which is shown in the drawing and described in the specification but only as indicated in the following claim.

What is claimed is:

A spring assembly providing substantial resistance to rebound comprising an elongated smooth single curved main spring leaf having an eye at each end for mounting on a vehicle, a substantially smooth single curved first auxiliary spring leaf appreciably shorter than said main leaf positioned in superimposed relation on one surface of said main leaf and extending in the same general direction as said main leaf and having an eye formed at each end with the eyes extending away from the main leaf, a plurality of progressively shorter smooth single curved auxiliary spring leaves positioned in superimposed relation on the other surface of said main leaf with one of said plurality of auxiliary spring leaves being of substantially the same length as said first smooth single curved auxiliary leaf and having an eye formed at each end with such eyes being directly opposite said eyes on said first smooth single curved auxiliary leaf and extending away from said main leaf, pivot pins in each eye of said first and said one auxiliary leaves, fixed links connecting the pivot pins between the corresponding adjacent eyes on said first auxiliary leaf and said one auxiliary leaf with such links being of a length to maintain the leaves in substantially contacting relation throughout their lengths whereby an effective frictional binding action is maintained betwen the individual leaves thereby obtaining effective frictional contact over an extended area of said leaves resisting forces deflecting the spring assembly in both directions, said first auxiliary leaf and said one auxiliary leaf being of substantially the same length and the connecting links maintaining substantially parallel relationship during the deflection of the leaf spring assembly, at least one additional auxiliary spring leaf being superimposed on said first auxiliary leaf and being connected to the spring assembly adjacent the center to provide cantilever leaf spring portions engaging the adjacent surface of said first auxiliary leaf, one of said plurality of auxiliary spring leaves being in superimposed relation on said one auxiliary spring leaf and being appreciably shorter than said one auxiliary spring leaf and being connected to said spring assembly adjacent the center thereof to provide cantilever leaf spring portions engaging said one auxiliary leaf spring.

References Cited in the file of this patent

UNITED STATES PATENTS

| | | |
|---|---|---|
| 1,381,255 | Tisman | June 14, 1921 |
| 1,922,001 | Goltry | Aug. 8, 1933 |

FOREIGN PATENTS

| | | |
|---|---|---|
| 293,742 | Great Britain | Sept. 27, 1928 |